(12) United States Patent
Shim

(10) Patent No.: US 9,164,562 B2
(45) Date of Patent: Oct. 20, 2015

(54) DATA STORAGE DEVICE FOR FORCIBLY DISCHARGING RESIDUAL VOLTAGE, METHOD OPERATING THE SAME, AND DATA PROCESSING SYSTEM INCLUDING THE SAME

(71) Applicant: In Bo Shim, Osan-si (KR)

(72) Inventor: In Bo Shim, Osan-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 14/496,586

(22) Filed: Sep. 25, 2014

(65) Prior Publication Data

US 2015/0121093 A1    Apr. 30, 2015

(30) Foreign Application Priority Data

Oct. 24, 2013    (KR) .................. 10-2013-0127062

(51) Int. Cl.
*G11C 5/14* (2006.01)
*G06F 1/26* (2006.01)

(52) U.S. Cl.
CPC . *G06F 1/266* (2013.01); *G06F 1/26* (2013.01)

(58) Field of Classification Search
CPC ................................ G06F 1/266; G06F 1/26
USPC ............... 365/228, 185.25; 361/93.9, 89; 307/126, 52, 62
See application file for complete search history.

(56) References Cited

U.S. PATENT DOCUMENTS

| 5,579,215 A * | 11/1996 | Turuta .............................. 363/57 |
| 5,852,358 A * | 12/1998 | Ehsani ........................... 323/240 |
| 6,038,515 A | 3/2000 | Kikuchi et al. |
| 6,060,864 A * | 5/2000 | Ito et al. ......................... 320/136 |
| 6,256,182 B1 * | 7/2001 | Suzuki et al. ................ 361/93.9 |
| 7,072,218 B2 | 7/2006 | Fujito et al. |
| 7,200,015 B1 * | 4/2007 | Mirskiy .......................... 363/47 |
| 7,250,811 B2 | 7/2007 | Kim |
| 7,714,637 B2 | 5/2010 | Kuriyama |
| 7,864,607 B2 | 1/2011 | Patel et al. |
| 8,233,346 B2 | 7/2012 | Hirota |
| 8,242,633 B2 | 8/2012 | Huang |
| 2002/0030960 A1 * | 3/2002 | Ku ................................. 361/234 |
| 2004/0205363 A1 * | 10/2004 | Alperin et al. ................ 713/300 |
| 2005/0141740 A1 * | 6/2005 | Preves et al. .................. 381/323 |
| 2007/0023400 A1 * | 2/2007 | Buhler et al. .............. 219/69.18 |
| 2007/0046276 A1 * | 3/2007 | Taki et al. ...................... 323/312 |
| 2009/0284081 A1 * | 11/2009 | Huang et al. .................... 307/99 |
| 2013/0030621 A1 | 1/2013 | Chung et al. |
| 2014/0036561 A1 * | 2/2014 | Sakurai et al. ................ 363/126 |
| 2014/0306948 A1 * | 10/2014 | Iwamoto et al. .............. 345/213 |

FOREIGN PATENT DOCUMENTS

KR    100324310 B1    1/2002

* cited by examiner

*Primary Examiner* — Viet Q Nguyen
(74) *Attorney, Agent, or Firm* — Harness, Dickey & Pierce, P.L.C.

(57) ABSTRACT

A data storage device includes a voltage supply control circuit configured to receive an external voltage, generate different voltages from the external voltage, and supply the different voltages to loads, respectively, through voltage supply lines, respectively and a discharge control circuit configured to discharge residual voltages from the voltage supply lines in response to a control signal and the external voltage, the discharge control circuit configured to discharge the residual voltages in an order of a highest residual voltage to a lowest residual voltage.

20 Claims, 8 Drawing Sheets

US 9,164,562 B2

DATA STORAGE DEVICE FOR FORCIBLY DISCHARGING RESIDUAL VOLTAGE, METHOD OPERATING THE SAME, AND DATA PROCESSING SYSTEM INCLUDING THE SAME

CROSS-REFERENCE TO RELATED APPLICATIONS

This application claims priority under 35 U.S.C. §119(a) from Korean Patent Application No. 10-2013-0127062 filed on Oct. 24, 2013, the disclosure of which is hereby incorporated by reference in its entirety.

BACKGROUND

Embodiments of inventive concepts relate to voltage control of a data storage device, a method of operating the same, and/or a data processing system including the same.

A data storage device is a device that stores data. The data storage device operates when it is provided with an operating voltage. However, when the operating voltage supplied to the data storage device is cut off or interrupted, components of the data storage device may malfunction or get damaged due to a residual voltage existing in the data storage device.

SUMMARY

According to at least one example embodiment of inventive concepts, there is provided a data storage device including a voltage supply control circuit configured to receive an external voltage, generate different voltages from the external voltage, and supply the different voltages to loads, respectively, through voltage supply lines, respectively; and a discharge control circuit configured to discharge residual voltages from the voltage supply lines in response to a control signal and the external voltage, the discharge control circuit configured to discharge the residual voltages in an order of a highest residual voltage to a lowest residual voltage.

The discharge control circuit is configured to discharge the residual voltages through diodes, respectively, the diodes connected to the voltage supply lines, respectively.

At least one of the diodes may be a diode-connected transistor. Alternatively, at least one of the diodes may be a two-terminal electronic component with asymmetric conductance.

The voltage supply control circuit is configured to detect a change in the external voltage and output a cut-off signal. The discharge control circuit is configured to detect the change in the external voltage, generate a detection signal, and generate the control signal based on the cut-off signal and the detection signal. The discharge control circuit may include a control signal generator configured to output the control signal based on the external voltage.

Alternatively, the voltage supply control circuit is configured to detect a cut-off of the supply of the external voltage and output a cut-off signal, and the discharge control circuit is configured to generate the control signal in response to the cut-off signal.

The discharge control circuit may include diodes respectively connected to the voltage supply lines and a switch circuit configured to connect a common node of the diodes to a ground in response to the control signal.

The discharge control circuit may further include current limiting circuits connected in parallel between the common node and the switch circuit. At this time, at least one of the diodes may be a two-terminal electronic component with asymmetric conductance.

As another alternative, the voltage supply control circuit may output state signals of the different voltages, respectively, supplied to the loads. At this time, the discharge control circuit may include a control signal generator configured to detect cut-off of a supply of the external voltage, generate a detection signal, and output the control signal based on the state signals and the detection signal; diodes respectively connected to the voltage supply lines; and a switch circuit configured to connect a common node of the diodes to a ground in response to the control signal.

The data storage device may be a solid state drive (SSD).

According to at least one example embodiment of inventive concepts, there is provided a data processing system including the above-described data storage device, a power source configured to supply the external voltage, and a host configured to control an operation of the data storage device. The discharge control circuit may forcibly discharge the residual voltages respectively through two-terminal electronic components with asymmetric conductance, which are respectively connected to the voltage supply lines, using the top-down approach.

According to at least one example embodiment of inventive concepts, there is provided a method of discharging a voltage from a data storage device. The method includes supplying different voltages to loads, respectively, based on an external voltage, the different voltages being supplied through voltage supply lines, respectively; detecting a cut-off of supply of the external voltage and generating a control signal; and discharging residual voltages from the respective voltage supply lines in descending order of voltage level in response to the control signal. The discharging the residual voltages may include forcibly discharging the residual voltages respectively through two-terminal electronic components with asymmetric conductance, which are respectively connected to the voltage supply lines.

At least one example embodiment discloses a data storage device including a power supply control circuit configured to generate a plurality of internal voltages based on an external voltage, a plurality of load devices configured to operate based on the plurality of internal voltages, respectively and a discharge control circuit between the power supply control circuit and the plurality of load devices, the discharge control circuit configured to discharge the plurality of internal voltages based on the external voltage.

In an example embodiment, the power supply control circuit is configured to generate a reduced voltage signal if the external voltage is below a voltage threshold and the discharge control circuit is configured to discharge the plurality of internal voltages based on the external voltage and the reduced voltage signal.

In an example embodiment, the discharge control circuit includes, a plurality of diodes configured to receive the plurality of internal voltages, respectively, the plurality of diodes configured to discharge the plurality of internal voltages in an order of a highest voltage to a lowest voltage.

In an example embodiment, the plurality of diodes are connected to a common node.

In an example embodiment, the storage device includes a control signal generator configured to generate a control signal based on the external voltage and a switch circuit connected between the plurality of diodes and a ground voltage and configured to receive the control signal, the plurality of diodes being configured to discharge the plurality of internal voltages based on the control signal.

BRIEF DESCRIPTION OF THE DRAWINGS

These and/or other aspects and advantages of inventive concepts will become apparent and more readily appreciated from the following description of example embodiments, taken in conjunction with the accompanying drawings of which.

DETAILED DESCRIPTION OF EXAMPLE EMBODIMENTS

Figure 1:
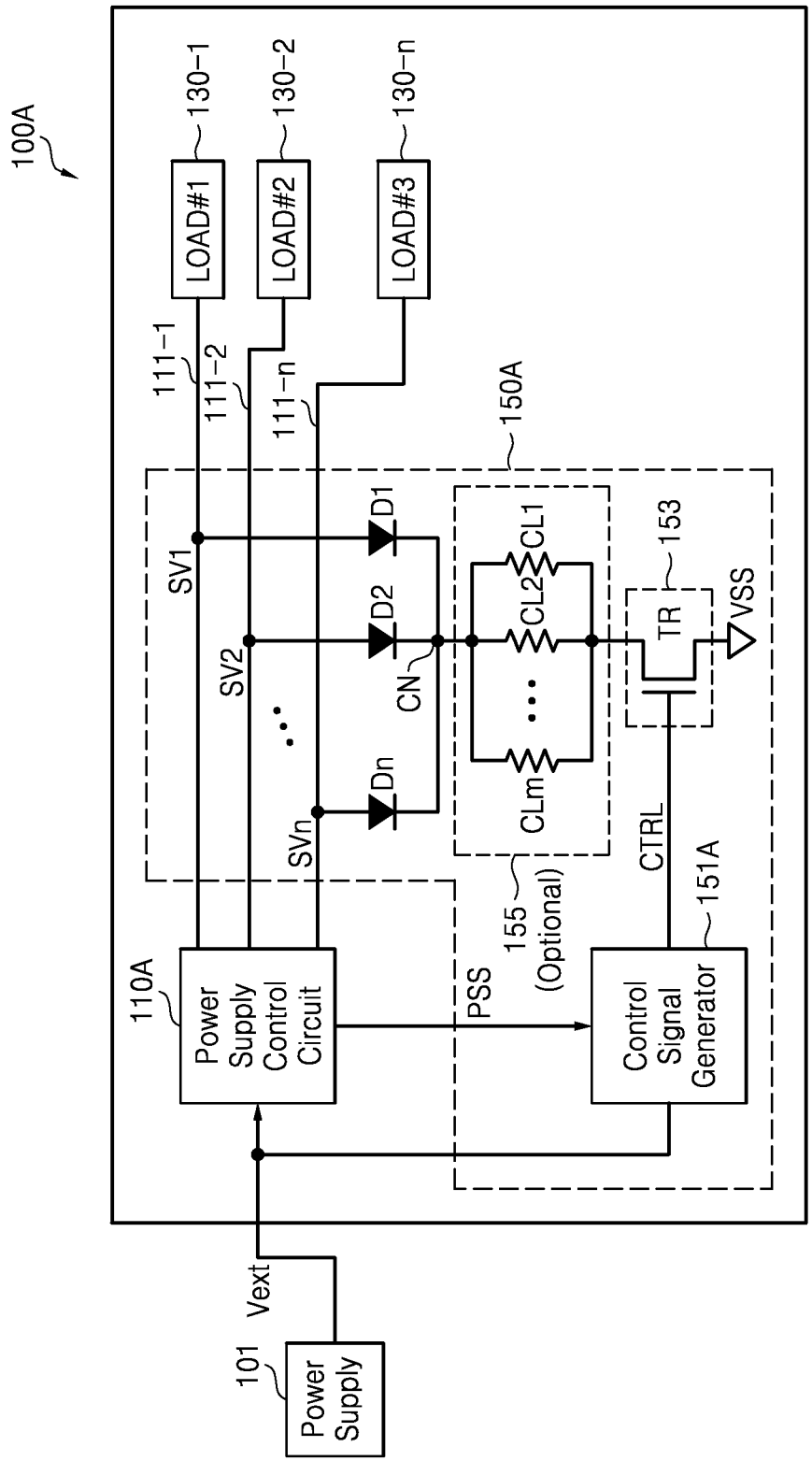
FIG. 1 is a block diagram of a data storage device according to an example embodiment of inventive concepts.

Inventive concepts now will be described more fully hereinafter with reference to the accompanying drawings, in which example embodiments are shown. Example embodiments may, however, be embodied in many different forms and should not be construed as limited to the embodiments set forth herein. Rather, example embodiments are provided so that this disclosure will be thorough and complete, and will fully convey the scope of example embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data storage device 100A according to an example embodiment of inventive concepts. The data storage device 100A includes a voltage (or power) supply control circuit 110A, a plurality of loads 130-1 through 130-n (where "n" is a natural number), and a discharge control circuit 150A.

The data storage device 100A may be any one of various types of data storage devices that store data. For instance, the data storage device 100A may be a flash-based data storage device. The data storage device 100A may be implemented as a solid state drive (SSD), an embedded SSD (eSSD), a multimedia card (MMC), an embedded MMC (eMMC), a universal flash storage (UFS), or a universal serial bus (USB) flash drive. The data storage device 100A may be implemented as a hard disc drive (HDD).

The power supply control circuit 110A may be implemented as a power management unit (PMU) or a power management integrated circuit (IC).

The power supply control circuit 110A may generate a plurality of voltages SV1 through SVn using an external voltage Vext supplied by a power supply 101 and may apply the voltages SV1 through SVn to the loads 130-1 through 130-n, respectively, through voltage supply lines 111-1 through 111-n, respectively. The voltages SV1 through SVn may have a different voltage level from one another.

Each of the loads 130-1 through 130-n may be a circuit or a functional block included in the data storage device 100A. For instance, the load 130-1 may be a memory controller, the load 130-2 may be a flash memory, and the load 130-n may be dynamic random access memory (DRAM).

When the supply of the external voltage Vext is cut off or in case of power-off, the discharge control circuit 150A may forcibly discharge residual voltages in the voltage supply lines 111-1 through 111-n in descending order of voltage level, i.e., from the highest voltage to the lowest voltage, in response to an activated control signal CTRL. Here, a process of discharging residual voltage in descending order of voltage level is defined as a top-down approach.

Figure 2:
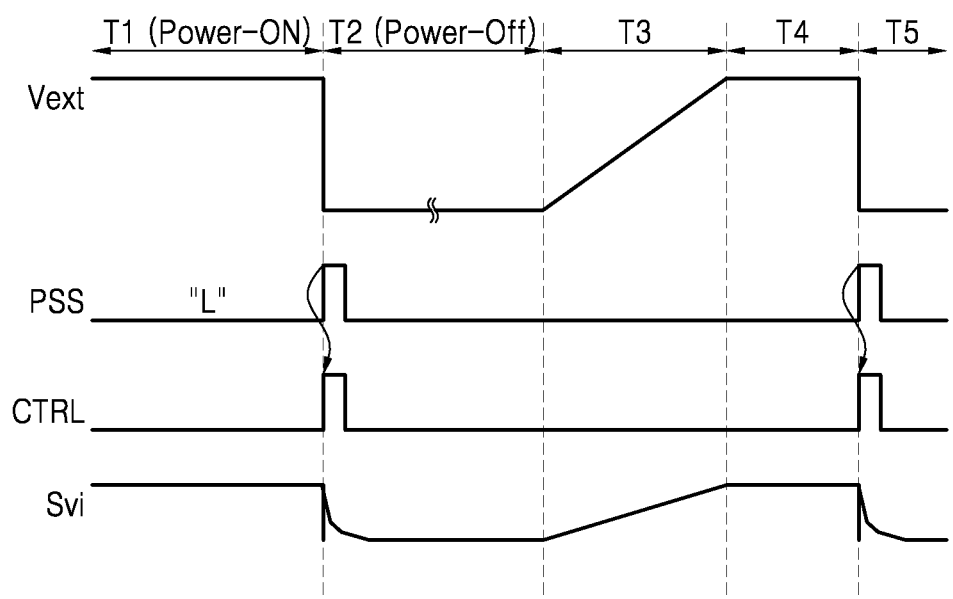
FIG. 2 is a waveform diagrams of signals for explaining the operation of the data storage device illustrated in FIG. 1.

FIG. 2 is a waveform diagrams of signals for explaining the operation of the data storage device 100A illustrated in FIG. 1.

Referring to FIGS. 1 and 2, during a first period T1, that is, while the external voltage Vext is being supplied, the power supply control circuit 110A outputs a deactivated cut-off signal PSS. At this time, a control signal generator 151A detects the supply of the external voltage Vext and generates a deactivated detection signal and the control signal generator 151A generates the deactivated control signal CTRL in response to the cut-off signal PSS and the detection signal. For instance, the deactivated control signal CTRL may be at a low level.

For instance, the cut-off signal PSS may function as an indication signal (or indication signals) indicating that a power-up sequence or a power down sequence is being performed. In addition, the cut-off signal PSS may be the generic name for state signals of the respective voltages SV1 through SVn supplied to the respective loads 130-1 through 130-n.

A switch circuit 153 remains in an off-state in response to the deactivated control signal CTRL, so that each of the voltage supply lines 111-1 through 111-n supplies a voltage SVi (where "i" is 1 through n) to each of the loads 130-1 through 130-n. The switch circuit 153 may be implemented as a metal oxide semiconductor (MOS) transistor, e.g., an N-channel MOS (NMOS) transistor.

When a second period T2 starts, that is, when the supply of the external voltage Vext is cut off or the external voltage Vext is lower than a threshold voltage, the power supply control circuit 110A outputs the activated cut-off signal PSS. The control signal generator 151A detects the cut-off of the external voltage Vext, generates the activated detection signal, and generates the activated control signal CTRL in response to the cut-off signal PSS and the detection signal. The activation width (or pulse width) of the signals PSS and CTRL may vary with design.

The switch circuit 153 is turned on in response to the activated control signal CTRL.

In an example embodiment, the first voltage SV1 is 10 V, the second voltage SV2 is 5 V, the n-th voltage SVn is 2 V, the threshold voltage of diodes D1 through Dn is 0.7 V, and a common node CN of the diodes D1 through Dn is directly connected to the switch circuit 153. However, the voltage levels are not limited thereto.

When the switch circuit 153 is turned on, the diode D1 is turned on, and therefore, the voltage SV1 of the voltage supply line 111-1, i.e., the highest residual voltage SV1 is forcibly discharged to a ground VSS through the diode D1 and the switch circuit 153. Until the highest residual voltage SV1 becomes 4.3 V, the highest residual voltage SV1 is forcibly discharged to the ground VSS through the diode D1 and the switch circuit 153.

However, when the voltage of the common node CN becomes 4.3 V, the diode D2 is turned on, and therefore, the voltage SV2 of the power supply line 111-2, i.e., the second highest residual voltage SV2 is forcibly discharged to the ground VSS through the diode D2 and the switch circuit 153. At this time, the voltage SV1 of the power supply line 111-1 is continuously forcibly discharged to the ground VSS through the diode D1 and the switch circuit 153.

In this manner, when the voltage of the common node CN becomes 1.3 V, the diode Dn is turned on, and therefore, the voltage SVn of the power supply line 111-n, i.e., the lowest residual voltage SVn is forcibly discharged to the ground VSS through the diode Dn and the switch circuit 153. At this time, the voltages SV1 and SV2 of the respective power supply lines 111-1 and 111-2 are continuously forcibly discharged to the ground VSS through the diodes D1 and D2, respectively, and the switch circuit 153.

The diodes D1 through Dn are described as elements for forcibly discharging residual voltages from the voltage supply lines 111-1 through 111-n, but this is just an example. In an example embodiment, at least one of the diodes D1 through Dn may be implemented as an active component (e.g., a diode-connected transistor). Alternatively, at least one of the diodes D1 through Dn may be implemented as a two-terminal electronic component with asymmetric conductance, which can function as a diode.

In an example embodiment, the discharge control circuit 150A may also include a current limiting block 155 between the common node CN and the switch circuit 153. The current limiting block 155 may limit the current supplied to the switch circuit 153.

The current limiting block 155 may include current limiting circuits CL1 through CLm connected in parallel between the common node CN and the switch circuit 153. For instance, each of the current limiting circuits CL1 through CLm may be implemented as an active component that can limit current.

Referring to FIGS. 1 and 2, during a third period T3, that is, while the external voltage Vext is increasing to a target voltage, the power supply control circuit 110A outputs the deactivated cut-off signal PSS. At this time, the control signal generator 151A detects the start of the supply of the external voltage Vext, generates the deactivated detection signal, and generates the deactivated control signal CTRL in response to the cut-off signal PSS and the detection signal. At this time, the power supply control circuit 110A and the control signal generator 151A may determine that the power-up sequence is performed on the external voltage Vext.

The switch circuit 153 remains in the off-state in response to the deactivated control signal CTRL, and therefore, each of the voltage supply lines 111-1 through 111-n supplies a voltage SVi (where "i" is 1 through n) to one of the loads 130-1 through 130-n.

Since the discharge control circuit 150A outputs the deactivated control signal CTRL when the external voltage Vext starts to be supplied till the external voltage Vext is cut off, the switch circuit 153 remains in the off-state while the power-up sequence is being performed.

The operation of the discharge control circuit 150A during a fourth period T4 is substantially the same as that during the first period T1. Also, the operation of the discharge control circuit 150A during a fifth period T5 is substantially the same as that during the second period T2.

Figure 3:
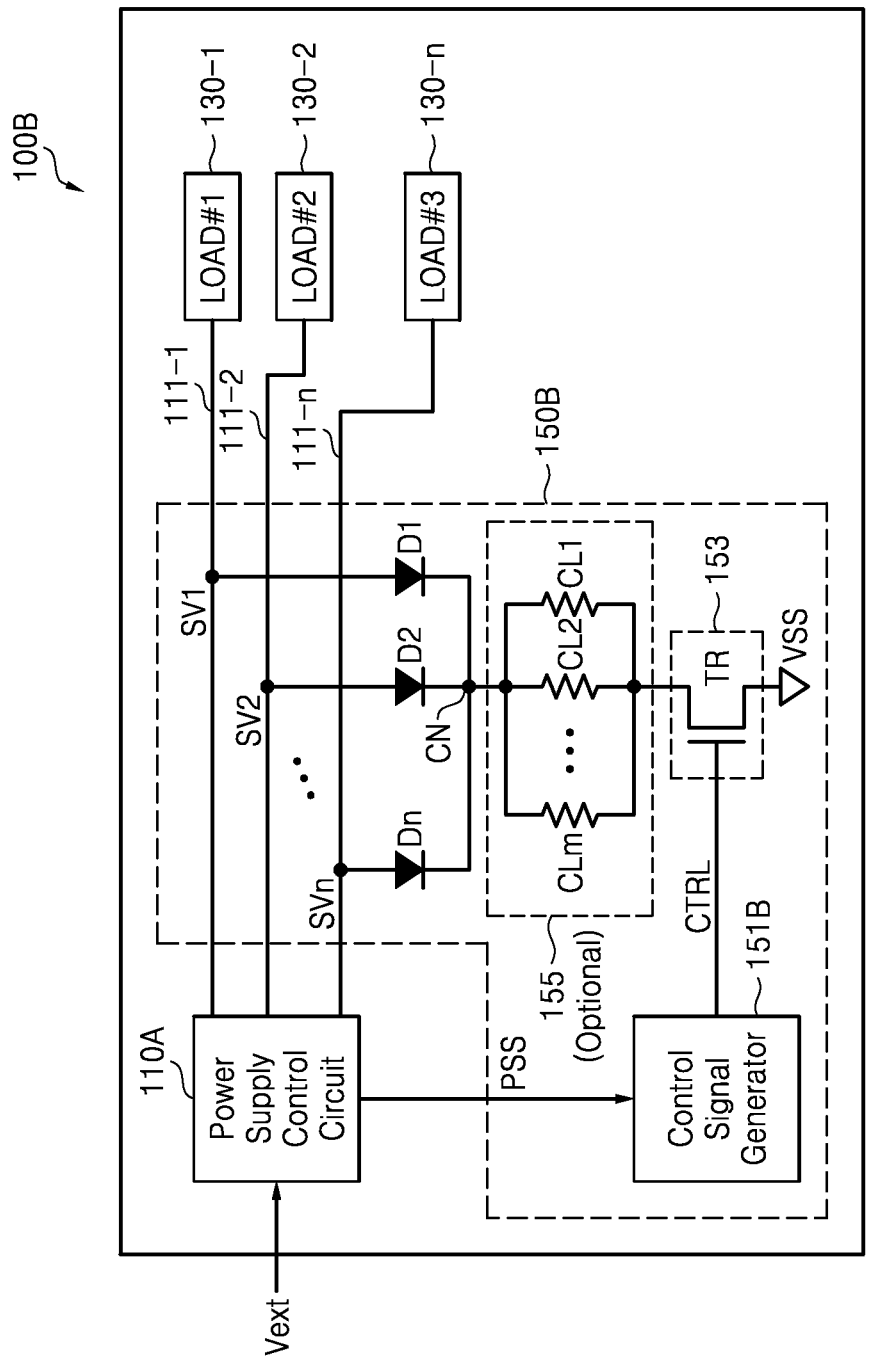
FIG. 3 is a block diagram of a data storage device according to an example embodiment of inventive concepts.

FIG. 3 is a block diagram of a data storage device 100B according to another example embodiment of inventive concepts. Referring to FIGS. 1 and 3, apart from a control signal generator 151B, the structure and operation of a discharge control circuit 150B included in the data storage device 100B illustrated in FIG. 3 are substantially the same as those of the discharge control circuit 150A included in the data storage device 100A illustrated in FIG. 1.

Referring to FIGS. 2 and 3, during the first or fourth period T1 or T4, that is, while the external voltage Vext is being supplied, the power supply control circuit 110A outputs the deactivated cut-off signal PSS. At this time, the control signal generator 151B generates the deactivated control signal CTRL in response to the deactivated cut-off signal PSS. Accordingly, the switch circuit 153 remains in the off-state in response to the deactivated control signal CTRL.

During the third period T3, the power supply control circuit 110A outputs the deactivated cut-off signal PSS. The control signal generator 151B generates the deactivated control signal CTRL in response to the deactivated cut-off signal PSS. Accordingly, the switch circuit 153 remains in the off-state in response to the deactivated control signal CTRL.

At the beginning of the second or fifth period T2 or T5, that is, when the supply of the external voltage Vext is cut off, the power supply control circuit 110A outputs the activated cut-off signal PSS. At this time, the control signal generator 151B generates the activated control signal CTRL in response to the activated cut-off signal PSS. Accordingly, the switch circuit 153 is turned on in response to the activated control signal CTRL.

Figure 4:
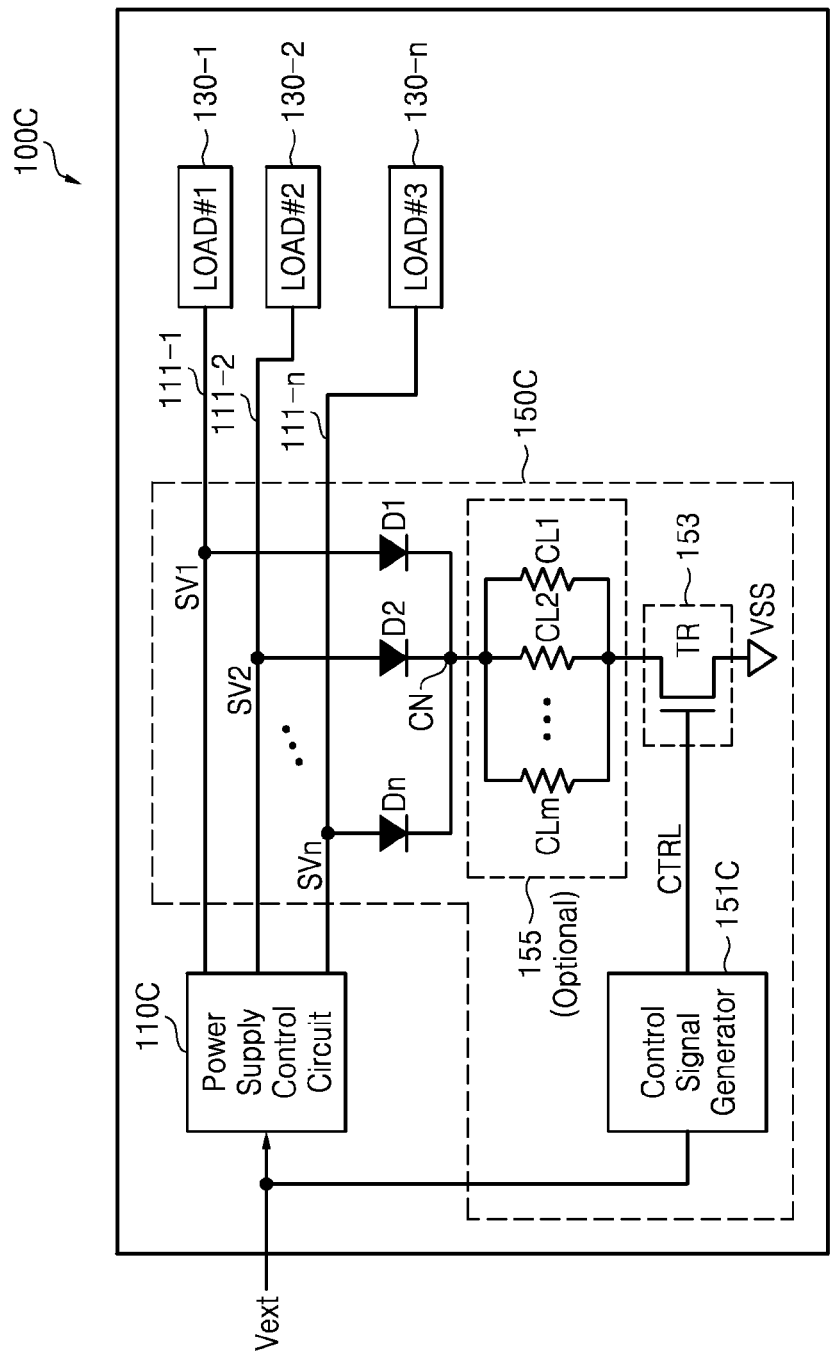
FIG. 4 is a block diagram of a data storage device according to another example embodiment of inventive concepts.

FIG. 4 is a block diagram of a data storage device 100C according to another example embodiment of inventive concepts. Referring to FIGS. 1 and 4, apart from a control signal generator 151C and a power supply control circuit 110C, the structure and operation of a discharge control circuit 150C included in the data storage device 100C illustrated in FIG. 4 are substantially the same as those of the discharge control circuit 150A included in the data storage device 100A illustrated in FIG. 1.

Referring to FIGS. 2 and 4, during the first or fourth period T1 or T4, that is, while the external voltage Vext is being supplied, the control signal generator 151C detects the supply of the external voltage Vext, generates a deactivated detection signal, and generates the deactivated control signal CTRL in response to the deactivated detection signal. Accordingly, the switch circuit 153 remains in the off-state in response to the deactivated control signal CTRL.

During the third period T3, the control signal generator 151C detects the start of the supply of the external voltage Vext, generates the deactivated detection signal, and generates the deactivated control signal CTRL in response to the deactivated detection signal. Accordingly, the switch circuit 153 remains in the off-state in response to the deactivated control signal CTRL.

At the beginning of the second or fifth period T2 or T5, the control signal generator 151C detects the cut-off of the supply of the external voltage Vext, generates the activated detection signal, and generates the activated control signal CTRL in response to the activated detection signal. Accordingly, the switch circuit 153 is turned on in response to the activated control signal CTRL.

Figure 5A:
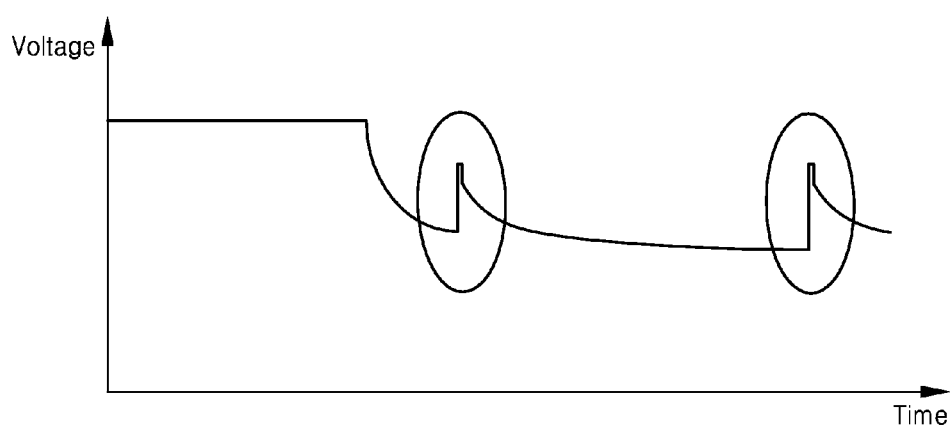
FIG. 5A is a diagram of the voltage discharge waveform of a data storage device that does not include a discharge control circuit.
Figure 5B:
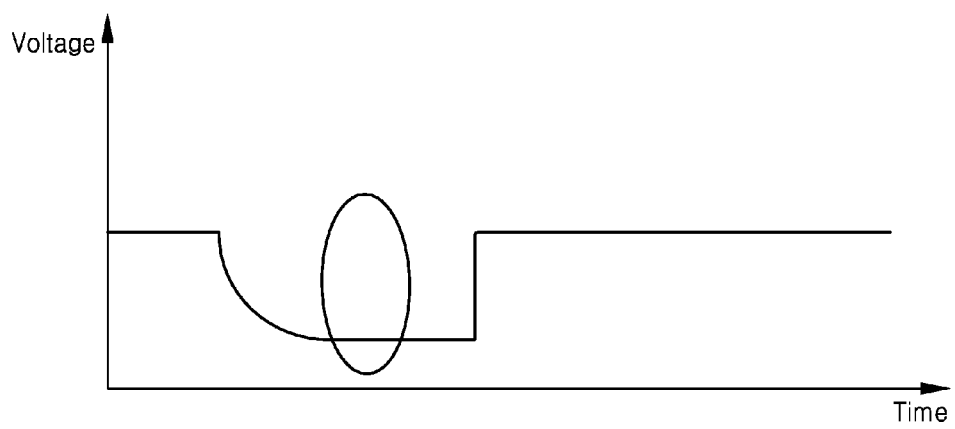
FIG. 5B is a diagram of the voltage discharge waveform of a data storage device that include the discharge control circuit in another example embodiment of inventive concepts.

FIG. 5A is a diagram of the voltage discharge waveform of a data storage device that does not include the discharge control circuit 150A, 150B, or 150C. FIG. 5B is a diagram of the voltage discharge waveform of a data storage device that include the discharge control circuits 150A, 150B or 150C in example embodiment of inventive concepts.

Referring to FIG. 5A, when the supply of the external voltage Vext is cut off, a residual voltage that has been supplied to each of the loads 130-1 through 130-n is not forcibly discharged, and therefore, the residual voltage rapidly increases as shown in the loops.

However, since a residual voltage that has been supplied to each of the loads 130-1 through 130-n is forcibly discharged when the supply of the external voltage Vext is cut off in the data storage device 100A, 100B, or 100C including the discharge control circuit 150 (150A, 150B or 150C), there is no rapid increase of the residual voltage as shown in the loop illustrated in FIG. 5B.

The data storage device 100 may be implemented in an integral form or all-in-one. The cut-off of the supply of the external voltage Vext generically indicates all cases where the data storage device 100 (100A, 100B or 100C) cannot operate normally with the external voltage Vext.

Figure 6:
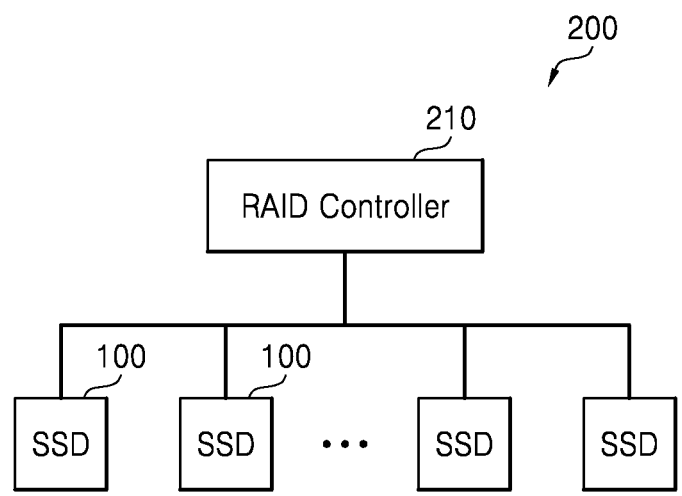
FIG. 6 is a block diagram of a data processing system including the data storage device illustrated in FIG. 1, 3, or 4 according to an example embodiment of inventive concepts.

FIG. 6 is a block diagram of a data processing system 200 including the data storage device 100 illustrated in FIG. 1, 3, or 4 according to example embodiment of inventive concepts. Referring to FIG. 6, the data processing system 200 includes a controller 210 and a plurality of data storage devices 100. Each of the data storage devices 100 may be implemented as an SSD.

When the data storage devices 100 form a redundant array of independent disks or a redundant array of inexpensive disks (RAID), the controller 210 may be implemented as a RAID controller. The controller 210 may be implemented as a host. The controller 210 may control the operation of the data storage devices 100. The data processing system 200 may include a power source (not shown) that supplies an external voltage to the data storage devices 100.

Figure 7:
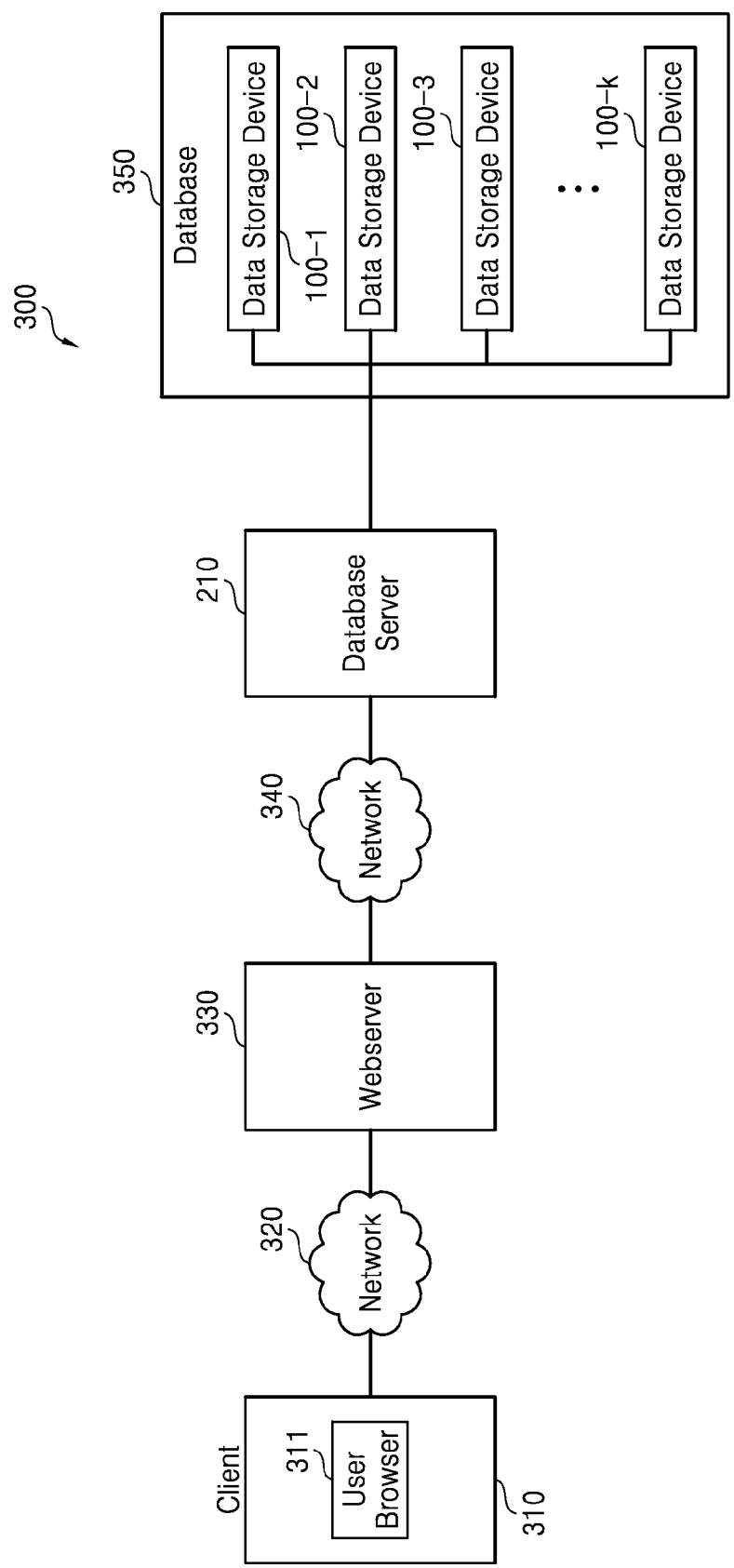
FIG. 7 is a block diagram of a data processing system including the data storage device illustrated in FIG. 1, 3, or 4 according to another example embodiment of inventive concepts.

FIG. 7 is a block diagram of a data processing system 300 including the data storage device 100 illustrated in FIG. 1, 3, or 4 according to another example embodiment of inventive concepts. Referring to FIG. 7, the data processing system 300 includes a client computer (simply referred to as a client) 310, a first network 320, a webserver 330, a second network 340, a database server 210, and a database 350. The data processing system 300 may be implemented as a database management system (DBMS). In another example embodiment, the data processing system 300 may be a web portal.

The client 310 may include a user browser 311. The user browser 311 may be a web browser.

When the user browser 311 transmits a search reference, e.g., a search keyword, input by a user through an input device (such as a keyboard, a mouse, or a touch screen) to the webserver 330 through the first network 320, the webserver 330 receives the search reference from the user browser 311. The first network 320 may be a wired or wireless internet.

The webserver 330 transmits a command corresponding to the search reference to the database server 210 through the second network 340. The database server 210 may perform the same function as the controller, RAID controller or host 210 illustrated in FIG. 6. The second network 340 may be a wired or wireless internet or an intranet.

The database 350 is defined as a physical device including a plurality of data storage devices 100-1 through 100-k, where "k" is a natural number. Each of the data storage devices 100-1 through 100-k may be implemented by the data storage device 100A, 100B, or 100C illustrated in FIG. 1, 3, or 4.

The database server 210 may perform a write or read operation on the data storage devices 100-1 through 100-k. The webserver 330 or the database server 210 may include a keyword search engine. The database server 210 may read data corresponding to the command from at least one of the data storage devices 100-1 through 100-k and transmit the read data to the second network 340.

The webserver 330 may receive the read data from the database server 210 through the second network 340 and transmit the read data to the user browser 311 of the client 310 through the first network 320. The user browser 311 may display the read data corresponding to the search reference on a display.

Figure 8:
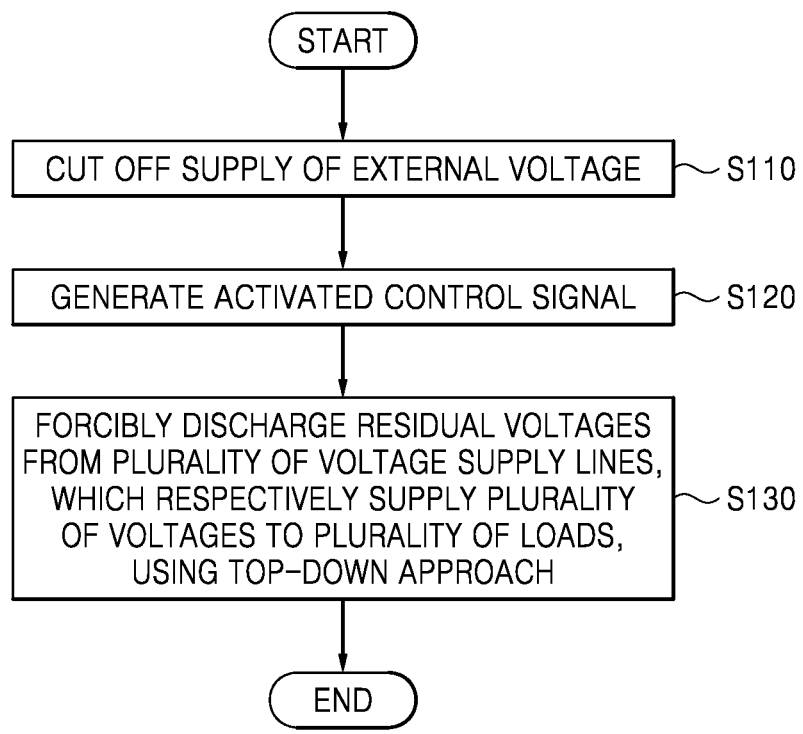
FIG. 8 is a flowchart of a method of operating a data storage device according to an example embodiment of inventive concepts.

FIG. 8 is a flowchart of a method of operating the data storage device 100 according to an example embodiment of inventive concepts. Referring to FIGS. 1 through 8, the power supply control circuit 110A or 110C supplies the voltages SV1 through SVn, which are generated to have a different level from each other using the external voltage Vext output from the power source, to the loads 130-1 through 130-n, respectively, through the voltage supply lines 111-1 through 111-n, respectively.

When the supply of the external voltage Vext is cut off in operation S110, the control signal generator 151A, 151B, or 151C generates the activated control signal CTRL based on the cut-off signal PSS and/or the detection signal in operation S120. The discharge control circuit 150A, 150B, or 150C forcibly discharges residual voltages from the respective voltage supply lines 111-1 through 111-n in descending order of voltage level, i.e., from the highest residual voltage to the lowest residual voltage, in response to the activated control signal CTRL in operation S130. In other words, the discharge control circuit 150A, 150B, or 150C forcibly discharges the residual voltages using the diodes D1 through Dn respectively connected to the voltage supply lines 111-1 through 111-n.

As described above, according to at least one example embodiment of inventive concepts, a data storage device forcibly discharges residual voltages in descending order of voltage level when the supply of an external voltage is cut off, thereby preventing malfunction or damage occurring in loads or components included in the data storage device.

While inventive concepts have been particularly shown and described with reference to example embodiments thereof, it will be understood by those of ordinary skill in the art that various changes in forms and details may be made therein without departing from the spirit and scope of inventive concepts as defined by the following claims.

What is claimed is:

1. A data storage device comprising:
   a voltage supply control circuit configured to receive an external voltage, generate different voltages from the external voltage, and supply the different voltages to loads, respectively, through voltage supply lines, respectively; and
   a discharge control circuit configured to discharge residual voltages from the voltage supply lines in response to a control signal and the external voltage, the discharge control circuit configured to discharge the residual voltages in an order of a highest residual voltage to a lowest residual voltage by linking the residual voltages to a common node in the discharge control circuit.

2. The data storage device of claim 1, wherein the discharge control circuit is configured to discharge the residual voltages through diodes, respectively, the diodes connected to the voltage supply lines, respectively.

3. The data storage device of claim 2, wherein at least one of the diodes is a diode-connected transistor.

4. The data storage device of claim 2, wherein at least one of the diodes is a two-terminal electronic component with asymmetric conductance.

5. The data storage device of claim 1, wherein
   the voltage supply control circuit is configured to detect a change in the external voltage and output a cut-off signal; and
   the discharge control circuit is configured to detect the change in the external voltage, generate a detection signal, and generate the control signal based on the cut-off signal and the detection signal.

6. The data storage device of claim 1, wherein the discharge control circuit comprises:
   a control signal generator configured to output the control signal based on the external voltage.

7. The data storage device of claim 1, wherein
   the voltage supply control circuit is configured to detect a cut-off of the external voltage and output a cut-off signal, and
   the discharge control circuit is configured to generate the control signal in response to the cut-off signal.

8. The data storage device of claim 1, wherein the discharge control circuit comprises:
   diodes respectively connected to the voltage supply lines, the diodes connected to the common node; and
   a switch circuit configured to connect the common node to a ground in response to the control signal.

9. The data storage device of claim 8, wherein the discharge control circuit further comprises:
   current limiting circuits connected in parallel between the common node and the switch circuit.

10. The data storage device of claim 8, wherein at least one of the diodes is a diode-connected transistor.

11. The data storage device of claim 8, wherein at least one of the diodes is a two-terminal electronic component with asymmetric conductance.

12. The data storage device of claim 1, wherein
    the voltage supply control circuit is configured to output respective state signals of the different voltages supplied to the loads, and
    the discharge control circuit includes,
       a control signal generator configured to detect a cut-off of the external voltage, generate a detection signal, and output the control signal based on the state signals and the detection signal;
       diodes connected to the voltage supply lines, respectively, the diodes connected to the common node; and
       a switch circuit configured to connect the common node to a ground in response to the control signal.

13. The data storage device of claim 12, wherein the discharge control circuit further comprises:
    current limiting circuits connected in parallel between the common node and the switch circuit.

14. The data storage device of claim 12, wherein at least one of the diodes is a two-terminal electronic component with asymmetric conductance.

15. The data storage device of claim 1, wherein the data storage device is a solid state drive (SSD).

16. A data processing system comprising:
    a data storage device;
    a power source configured to supply an external voltage; and
    a host configured to control an operation of the data storage device,
    wherein the data storage device including:
       a voltage supply control circuit configured to receive the external voltage, generate different voltages from the external voltage, and supply the different voltages to loads, respectively, through voltage supply lines, respectively; and
       a discharge control circuit configured to discharge residual voltages from the voltage supply lines in response to a control signal and the external voltage, the discharge control circuit configured to discharge the residual voltages in an order of a highest residual voltage to a lowest residual voltage by linking the residual voltages to a common node in the discharge control circuit.

17. The data processing system of claim 16, wherein the discharge control circuit is configured to discharge the residual voltages through two-terminal electronic components with asymmetric conductance, respectively, the two-terminal electronic components being respectively connected to the voltage supply lines.

18. The data processing system of claim 16, wherein the discharge control circuit comprises:
    a control signal generator configured to output the control signal based on the external voltage.

19. A method of discharging a voltage from a data storage device, the method comprising:
    supplying different voltages to loads, respectively, based on an external voltage, the different voltages being supplied through voltage supply lines, respectively;
    detecting a cut-off of the external voltage and generating a control signal; and
    discharging residual voltages from the voltage supply lines in descending order of voltage level in response to the control signal by linking the residual voltages to a common node in the discharge control circuit.

20. The method of claim 19, wherein the discharging the residual voltages comprises:
discharging the residual voltages respectively through two-terminal electronic components with asymmetric conductance, the two-terminal electronic components being respectively connected to the voltage supply lines.

* * * * *